United States Patent [19]
Anzel

[11] Patent Number: 5,443,231
[45] Date of Patent: Aug. 22, 1995

[54] METHOD AND APPARATUS FOR A SATELLITE STATION KEEPING

[75] Inventor: Bernard M. Anzel, El Segundo, Calif.

[73] Assignee: Hughes Aircraft Company, Los Angeles, Calif.

[21] Appl. No.: 153,512

[22] Filed: Nov. 17, 1993

[51] Int. Cl.$^6$ .............................................. B64G 1/26
[52] U.S. Cl. .................... 244/164; 244/169
[58] Field of Search .................. 244/158 R, 164, 165, 244/169, 172; 344/3.22

[56] References Cited

U.S. PATENT DOCUMENTS

| | | | |
|---|---|---|---|
| 3,907,226 | 9/1975 | Neufeld et al. | 244/169 |
| 4,630,790 | 12/1986 | Williams, Jr. | 244/164 |
| 5,020,746 | 6/1991 | Anzel | 244/169 |
| 5,318,256 | 6/1994 | Appleberry | 244/169 |

FOREIGN PATENT DOCUMENTS

| | | | |
|---|---|---|---|
| 0499815 | 8/1992 | European Pat. Off. | 244/169 |
| 0212298 | 8/1990 | Japan | 244/169 |

*Primary Examiner*—Galen L. Barefoot
*Attorney, Agent, or Firm*—Terje Gudmestad; W. K. Denson-Low

[57] ABSTRACT

A method and apparatus for satellite station keeping is disclosed in which four thrusters are mounted on the anti-nadir face of the satellite with their direction of thrust passing through the center of mass of the satellite. The thrust lines of the north pair (20, 22) of thrusters and the south (24, 26) pair of thrusters make an angle $\theta$ with the satellite north-south axis in a northern and southern direction respectively. The thrusters are laterally separated and slewed by an angle $\alpha$ about the north-south axis. Each thruster produces three components of $\Delta V$, i.e. normal, tangential and radial (toward the Earth), thereby providing complete control of the three orbit vectors, inclination, eccentricity and mean motion. In the event of failure of a thruster, the thruster diagonally opposite the failed thruster is shutdown and the remaining diagonal pair of thrusters is used to maintain station keeping.

20 Claims, 2 Drawing Sheets

METHOD AND APPARATUS FOR A SATELLITE STATION KEEPING

TECHNICAL FIELD

This invention relates to satellite station keeping and, more particularly, to a method and apparatus for maintaining the satellite in a stationary orbit through the simultaneous control of tangential, radial and normal acceleration components of thrust.

BACKGROUND ART

Synchronous satellites orbit the Earth with the same revolution rate as that of the Earth. Accordingly, the satellite appears above a fixed point on the Earth. Hence, synchronous satellites are often referred to as geostationary satellites and operate within a stationary orbit. Synchronous satellites are useful for many applications including weather and communication applications.

It is generally well known in the art that various forces act on synchronous satellites to move the satellite out of stationary orbit. These forces are due to several sources including the gravitational effects of the sun and moon, the elliptical shape of the Earth and solar radiation pressure. To counter these forces, synchronous satellites are equipped with propulsion systems that are fired at intervals in order to maintain station in a desired orbit. This requires control of the inclination, eccentricity and mean motion of the satellite. Inclination is the north-south position of the satellite relative to the Earth's equator. Eccentricity is the measure of the noncircularity of the satellite orbit. That is, the measure of the variation of the distance the satellite is from the Earth as the Earth and satellite rotate. Finally, mean motion is the average position of the satellite in an east-west direction relative to a sub-satellite point on the Earth. For a more detailed discussion see Controlling a Stationary Orbit Using Electric Propulsion by Bernard M. Anzel, presented to the 1988 International Electric Propulsion Conference in West Germany.

Station keeping was first achieved with a spin-stabilized communication satellite launched in 1964. Current satellites are either spin-stabilized or three-axis stabilized satellites. Spin-stabilized satellites use the gyroscopic effect of the satellite spinning to help maintain the satellite orbit. For certain applications, the size of the satellite militates in favor of a three-axis stabilization scheme. Current three-axis stabilized satellites use separate sets of thrusters to control north-south and east-west motions. The north thrusters produce the required north-south change in satellite velocity, or $\Delta V$, to control orbit inclination. The east thrusters and west thrusters produce the required combined east-west $\Delta V$ to control orbit mean motion and eccentricity. For each of these three maneuvers, thrusters are fired in pairs to cancel torques since the thrust directions do not pass through the satellite center of mass. Furthermore, there are three separate maneuvers performed at different times as required by the physics of the perturbations. The frequency of these maneuvers are typically every 14 days for both the north-south maneuver and the pair of east-west maneuvers (east and west firings occur approximately ½ orbit apart or about 12 hours) when using 5 pound thrusters with liquid propulsion.

In U.S. Pat. 5,020,746, assigned to the assignee of the present invention and incorporated herein by reference, station keeping of a three-axis stabilized satellite is provided using only two thrusters mounted on the anti-nadir face of the satellite. A north thruster is canted away from the face at an angle $\theta$ from the north-south axis of the satellite in a northern direction and a south thruster is canted away from the face at an angle $\theta$ from the north-south axis in a southern direction. Both thrusters are also translated to the east or west along an east-west axis of the satellite and swiveled at variable angles $\alpha_1$ and $\alpha_2$, respectively. The patent discloses a technique for determining the angles $\alpha_1$ and $\alpha_2$ and the firing positions of the thrusters in order to maintain the satellite in a stationary orbit.

A two thruster system such as disclosed in the aforementioned patent is constrained in several respects. In order to control east-west motion as well as north-south motion, the thruster mounting locations must be customized for the particular satellite station location. Notwithstanding this customization only a partial control of eccentricity is achieved. Also, in order to counter the eccentricity buildup resulting from a failure of one of the two thrusters, a back-up thruster must be provided.

SUMMARY OF THE INVENTION

The present invention provides a method and apparatus for satellite station keeping in which thruster mounting location is independent of satellite station location and which does not require a back-up thruster.

In accordance with the present invention, four thrusters are mounted on the anti-nadir face of a three-axis stabilized satellite with their direction of thrust passing through the center of mass of the satellite. The thrust lines of the north pair of thrusters and the south pair of thrusters make an angle $\theta$, of for example 36°, with the satellite north-south axis in a northern and southern direction respectively. The thrusters are laterally separated and slewed by an angle $\alpha$, of for example 10°, about the north-south axis. The four thrusters provide complete control of the three orbit vectors, namely, inclination, eccentricity and mean motion. Each thruster produces three components of $\Delta V$, i.e. normal, tangential and radial (toward the Earth), since their lines of thrust are directed through the satellite center of mass. With the configuration provided by the present invention, each of the north pair of thrusters is fired near the orbit ascending node and each of the south pair of thruster is fired near the orbit descending node. Each thruster firing produces tangential and radial $\Delta V$ components, which control east-west motion, simultaneously with the normal $\Delta V$ component which controls north-south motion.

In the event of failure of a thruster, the corresponding diagonally located thruster may be shut down and a third, simultaneous firing of the two remaining thrusters is performed midway between the ascending and descending nodes. This third firing produces equal $\Delta V$ components, resulting in normal and tangential $\Delta V$ cancellations but additive radial components. The radial components produced by this third firing cancel the eccentricity error created by the firing at the ascending and descending node.

DESCRIPTION OF THE PREFERRED EMBODIMENT

Figure 1:
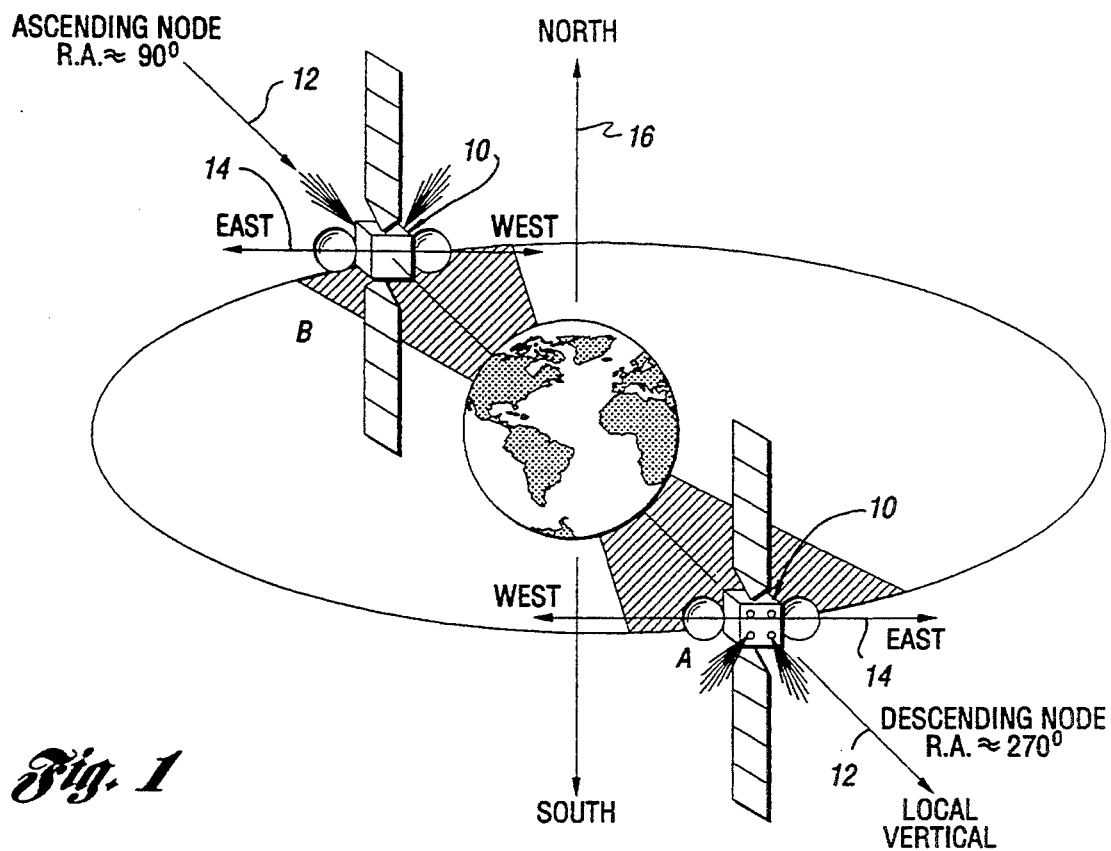
FIG. 1 shows a three-axis stabilized satellite in a stationary orbit about the Earth in two different positions to illustrate the improved method of satellite station keeping of the present invention.

Referring now to the drawings and initially to FIG. 1, a three-axis stabilized satellite 10 is shown in a stationary orbit about the Earth. A set of local coordinates for the satellite 10 is defined by the local vertical 12, by an east-west axis 14 and a north-south axis 16. The origin of the coordinates is the center of mass (C.M.) of the satellite 10. The local vertical 12, as shown in FIG. 1, is the line through the Earth and satellite 10 which represents the nadir and anti-nadir directions. The nadir direction is the direction toward the Earth, and the anti-nadir direction is the direction away from the Earth. FIG. 1 shows the satellite 10 in a first position A and a second position B to illustrate the location where the thruster firings take place. The cross-hatching in FIG. 1 is intending to indicate the burn arc of the thrusters.

Figure 2:
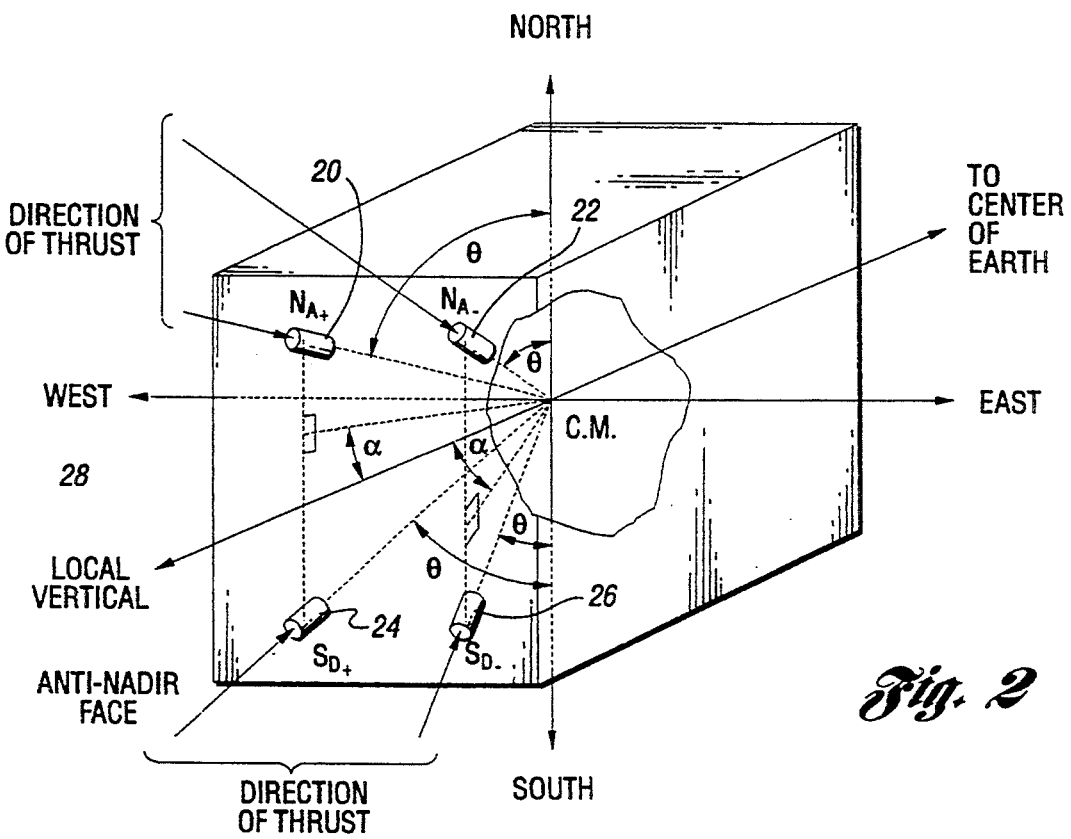
FIG. 2 shows a simplified 3-dimensional view of a three-axis satellite employing the four thruster system of the present invention.

Referring now to FIG. 2, four thrusters 20, 22, 24, and 26 are mounted on the anti-nadir face 28 of the satellite 10. The four thrusters are canted away from the anti-nadir face by an angle $\theta$ so that the thrust lines pass through the satellite center of mass. The north thruster pair 20, 22 are preferably mounted as close to the north end of the face 28 as is structurally possible. Likewise, the south thruster pair 24, 26 are mounted as close to the south end of the face 28 as is structurally possible. This mounting will minimize the cant angles of each pair and therefore minimize the cosine loss. The cosine loss is a geometric inefficiency in that for each unit of $\Delta V$ which a thruster produces, a smaller amount (equal to the cosine of the cant angle) appears in the north-south direction.

The thrust lines of the north thrusters 20 and 22 and the south thrusters 24 and 26 make the angle $\theta$, of for example 36°, with the north-south axis 16 in a northern and southern direction respectively. In addition to the cant angle $\theta$ away from the anti-nadir face, the thrusters are also laterally separated and slewed by an angle $\alpha$ about the north-south axis 16. The slew angle must be large enough to effectively control the orbit eccentricity. The slew angles are determined from the tangential $\Delta V$ requirements imposed by the maximum solar force to satellite mass ratio to be encountered during on-station life. This then determines the horizontal separation for both the north and south thruster pairs along the anti-nadir face. A slew angle of approximately 10–12° is appropriate. Due to small changes in the center of mass of the satellite over time, both the slew angle $\alpha$ and the cant angle $\theta$ may need to be changed. This angle modification may be accomplished by a conventional gimble and servo mechanism, not shown. The four thrusters 20–26 provide complete control of the three orbit vectors, namely, inclination, eccentricity and mean motion. Each thruster produces three components of $\Delta V$, i.e. normal, tangential and radial (toward the Earth), since their lines of thrust are directed through the satellite center of mass.

In most cases, the optimum time for providing north-south corrections to maintain the required inclination is at a right ascension (R.A.) of 90° for negative acceleration (south correction) and 270° for positive acceleration (north correction). (Right ascension is the angle measured in the equatorial plane from a reference position of the sun at vernal equinox to the satellite position). This is because most changes in inclination are produced by forces acting along an R.A. of 90°. In accordance with the present invention, the north thrusters 20 and 22 provide negative acceleration and are fired at R.A. =90° while the south thrusters 24 and 26 provide positive acceleration and are fired at R.A. =270°. If as shown in FIG. 1 the firing arcs are equal, each pair of thrusters will provide one-half the required north-south velocity increment. Those skilled in the art will recognize that the frequency with which the thrusters are fired may vary without departing from the scope of the present invention.

While both north thrusters 20, 22 are fired near the orbit ascending node (R.A. =90°), and both south thrusters 24, 26 are fired near the orbit descending node (R.A.=270°), such firings need not occur simultaneously. For example, the northwest thruster 20 may be fired before the ascending node and the northeast thruster 22 fired after the ascending node and a similar sequence would be followed for the south pair of thrusters at the descending node. In any event, these firings produce additive changes in inclination in a direction opposite to the effect of the sun/moon gravity perturbation. If the $\Delta V$'s produced by the firing of the north pair and south pair of thruster are equal, the radial components are equal, resulting in no net change in the orbit eccentricity. However, the radial $\Delta V$ components (always toward the Earth's center) produce generally unwanted additive eastward shifts in the mean longitude.

The north thrusters 20 and 22 produce positive and negative tangential components of $\Delta V$ respectively. A net tangential $\Delta V$ which can be either positive or negative is, therefore, available. This positive or negative net tangential $\Delta V$ is likewise available when firing the south thrusters 24 and 26. This versatility permits complete control of the vector eccentricity component along a coordinate axis defined by the line connecting the centroids of the north and south thrusting arcs. The tangential $\Delta V$ also provides simultaneously, the correction in mean motion necessary to counter the triaxiality perturbation, as well as the aforementioned eastward motion of the mean longitude arising from the radial $\Delta V$ components.

The inclination vector is completely controlled by the sum of the north-south $\Delta V$ components produced by the firings of the north and south pairs of thrusters. However, the firings need not be equal; in fact, by making them deliberately unequal, the difference in their radial components can be used to control the vector eccentricity component along a coordinate axis orthogonal to that connecting the north and south thrusting arc centroids.

Thus, the $\Delta V$ components required for each of the four thrusters will, in general, be unequal and vary with the perturbations; the thruster $\Delta V$ components controlling four orbit parameters, inclination, mean motion and two orthogonal eccentricity components. The two orthogonal eccentricity components produce the necessary vector eccentricity change to counter the effects of the solar radiation perturbations.

The ΔV components developed by the four thruster 20 ($NA_{A+}$), 22 ($N_{A-}$), 24 ($S_{D+}$), and 26 ($S_{D-}$) are shown in the Chart below.

| Thruster | ΔV COMPONENTS | | |
|---|---|---|---|
| | $\Delta V_N$ (Normal) | $\Delta V_T$ (Tangential) | $\Delta V_R$ (Radial) |
| $N_{A+}$ | South | East | Nadir |
| $N_{A-}$ | South | West | Nadir |
| $S_{D+}$ | North | East | Nadir |
| $S_{D-}$ | North | West | Nadir |

$\Delta V_R$ and $\Delta V_T$ are related to $\Delta V_N$ through the cant and slew angles $\theta$ and $\alpha$, respectively.
$\Delta V_R = \Delta V_N \tan \theta$
$\Delta V_T = \Delta V_N \tan \theta \tan \alpha$.
The four values of $\Delta V_N$ are:

$\Delta V_N(N_{A+}) = 1/2 \{[1/2(\Delta V_{DT} + \Delta V_{ET})/\tan\theta \tan\alpha] +$ $[1/2(\Delta V_{IN} - \Delta V_{ER}/\tan\theta)]\}$ $\Delta V_N(N_{A-}) = 1/2 \{[-1/2(\Delta V_{DT} + \Delta V_{ET})/\tan\theta \tan\alpha] +$ $[1/2(\Delta V_{IN} - \Delta V_{ER}/\tan\theta)]\}$ $\Delta V_N(S_{D+}) = 1/2 \{[1/2(\Delta V_{DT} - \Delta V_{ET})/\tan\theta \tan\alpha] +$ $[1/2(\Delta V_{IN} + \Delta V_{ER}/\tan\theta)]\}$ $\Delta V_N(S_{D-}) = 1/2 \{[-1/2(\Delta V_{DT} - \Delta V_{ET})/\tan\theta \tan\alpha] +$ $[1/2(\Delta V_{IN} + \Delta V_{ER}/\tan\theta)]\}$ where:
$\Delta V_{DT}$ = Required total tangential ΔV to control longitude mean motion.
$\Delta V_{ET}$ = Required total tangential ΔV to control orbit eccentricity component along axis connecting firing points.
$\Delta V_{ER}$ = Required total radial ΔV to control orbit eccentricity component along axis perpendicular to axis connecting firing points.
$\Delta V_{IN}$ = Required total normal ΔV to control orbit inclination.

The thruster firing time duration $T_p$ is given by:

$$T_P \approx \frac{2}{\omega_e} \sin^{-1}\left[\frac{\omega_e}{2}\left(\frac{m \cdot \Delta V_N}{F\cos\theta}\right)\right]$$

$\omega_e$ = earth rate, M = spacecraft mass, F = engine thrust and $\Delta V_N$ has four values corresponding to each of the four thruster ($N_{A+}$, $N_{A-}$, $S_{D+}$, $S_{D-}$) as specified by the equations above. The burn time per thruster (for a 17.7 millinewton thrust level) will average about one hour per day for normal operation.

Complete orbit control can still be maintained in the event of a failure of a pair of thrusters, provided that the failed thruster pair is diagonal, e.g., either 20 and 26 or 22 and 24. The nodal firings, occurring at positions A and B, for the remaining pair provide complete control of inclination and mean motion; however, the eccentricity will be incorrect. A third firing is performed at R.A.=0° or R.A.=180°, depending on which diagonal pair are available. At the third firing both thrusters are fired with equal ΔV components, resulting in normal and tangential ΔV cancellations. The radial components, however, will be additive and will provide the necessary eccentricity control. The time of firing and burn duration is chosen to nullify both the incorrect eccentricity produced by the nodal firings in addition to that produced by solar force.

Figure 3A:
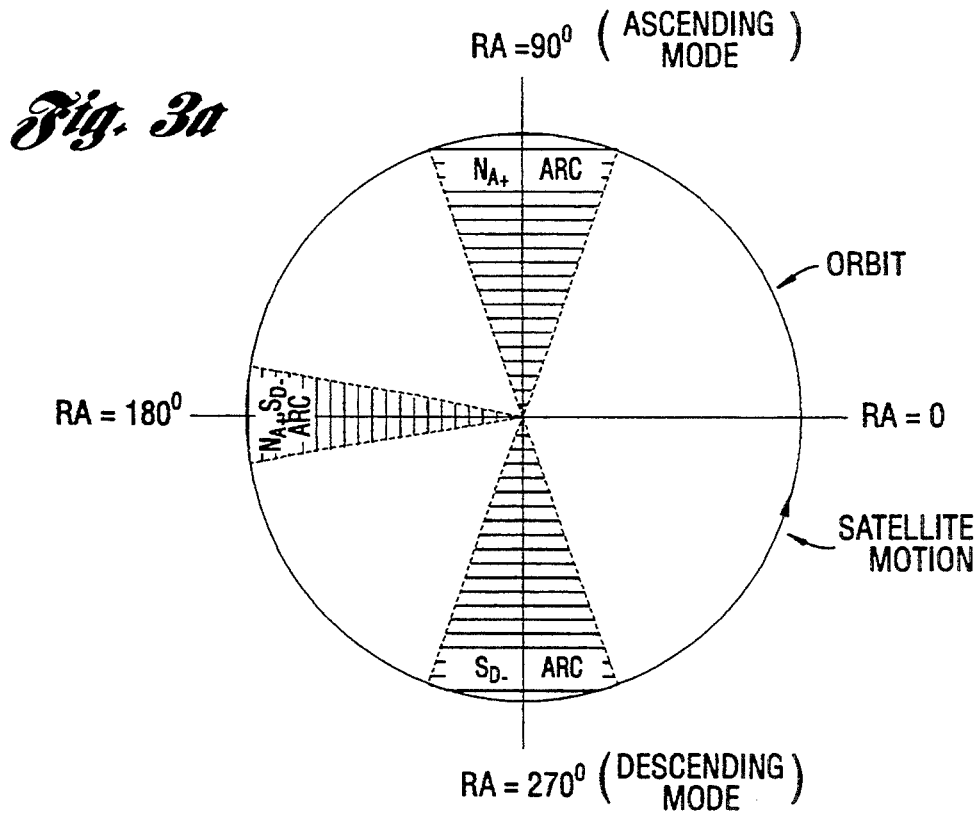
FIGS. 3A and 3B depict the burn arcs using each of the diagonal pairs of the thrusters to achieve satellite station keeping in the event of a failure of one of the thrusters in the four thruster system of the present invention.
Figure 3B:
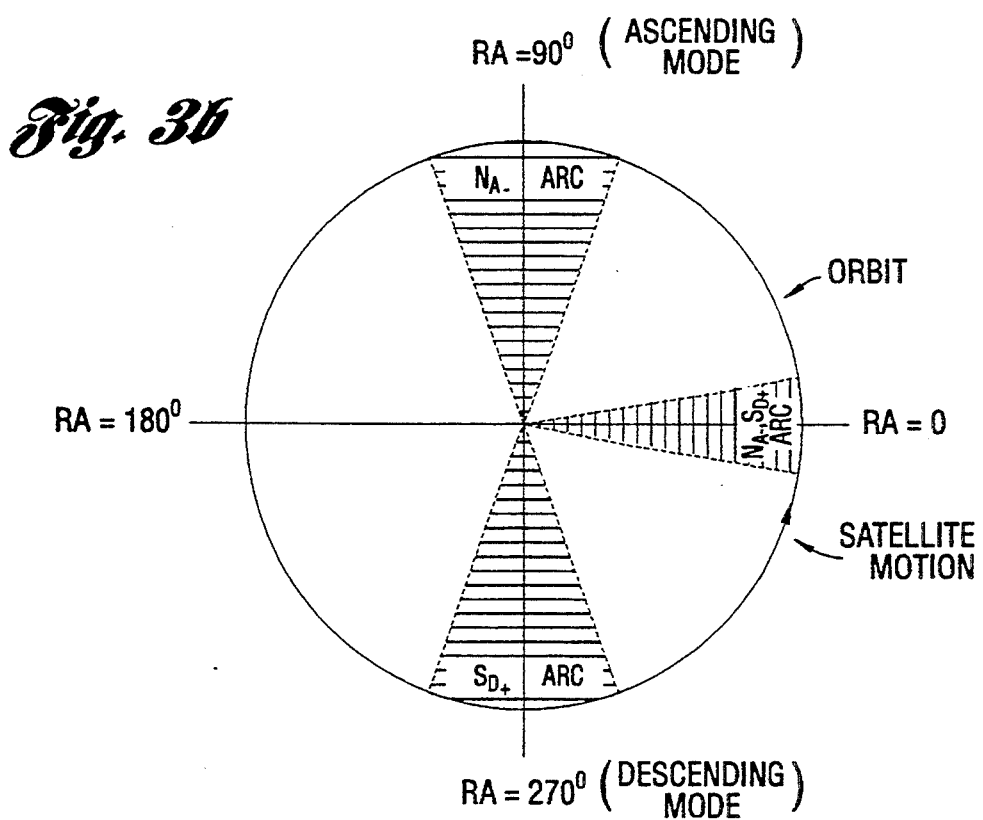

Thus, upon failure of any one of the thrusters 20-26, the corresponding diagonal thruster would be shut down and the firing procedure outlined above would be followed. There are two cases, either a) thruster 20 ($N_{A+}$) and thruster 26 ($S_{D-}$) are used, or b) thruster 22 ($N_{A-}$) and thruster 24 ($S_{D+}$) are used. The location along the orbit of the burn arcs are illustrated in FIGS. 3a and 3b. There are three burn arcs per orbit. Since the burn arcs at the nodal crossings (R.A.=90° and R.A.=270°) are performed by single thrusters in the failure case, they will each require about twice the burn time as for the nominal case, i.e. about 2 hours per thruster per day on the average. The third burn is performed by both thrusters equally and the required burn time per thruster per day is about ⅔ hour on the average for a slew angle of 10°. The burn arcs depicted in FIGS. 3a and 3b are shown for sun positions at the equinoxes. The length of the third burn will not be equal for either equinox, and will have slightly altered centroid locations along the orbit for other times of the year.

While the forms of the invention herein disclosed are presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:
1. A method of station keeping for a three-axis stabilized satellite having four thrusters mounted in a generally rectangular configuration on an anti-nadir face of the satellite, each of the four thrusters having a line of thrust which passes through the center of mass of the satellite, the four thrusters including a northwest thruster, a northeast thruster, a southwest thruster, and a southeast thruster, the method comprising the steps of:
 canting the northwest thruster and the northeast thruster away from the anti-nadir face in a north direction with respect to a north-south axis which passes through the center of mass of the satellite;
 canting the southwest thruster and the southeast thruster away from the anti-nadir face in a south direction with respect to the north-south axis;
 slewing the northeast thruster and the southeast thruster in an east direction about the north-south axis;
 slewing the northwest thruster and the southwest thruster in an west direction about the north-south axis;
 firing the northeast thruster and the northwest thruster near an orbit ascending node; and
 firing the southeast thruster and the southwest thruster near the orbit descending node;
 wherein each of the four thrusters is fired in accordance with a corresponding one of four firing time durations, each of the four firing time durations dependent upon a first predetermined quantity representative of a required change in tangential velocity to control longitude mean motion and a second predetermined quantity representative of a required change in tangential velocity to control an orbit eccentricity component along a first axis which connects the ascending node and the descending node, and wherein the four thrusters are slewed to provide effective control of the orbit eccentricity component.

2. The method of claim 1 wherein the northwest thruster is fired before the orbit ascending node and the northeast thruster is fired after the orbit ascending node.

3. The method of claim 1 wherein the southwest thruster is fired before the orbit descending node and the southeast thruster is fired after the orbit descending node.

4. The method of claim 1 wherein the northwest thruster and the northeast thruster are canted away from the anti-nadir face by a predetermined angle $\theta$ with respect to the north-south axis, and wherein the southwest thruster and the southeast thruster are canted away from the anti-nadir face by the predetermined angle $\theta$ with respect to the north-south axis.

5. The method of claim 1 wherein the northeast thruster and the southeast thruster are slewed about the north-south axis by a predetermined angle $\alpha$, and wherein the northwest thruster and the southwest thruster are slewed about the north-south axis by the predetermined angle $\alpha$.

6. The method of claim 5 wherein $\alpha$ is at least 10 degrees.

7. The method of claim 1 wherein each of the four firing time durations is further dependent upon a third predetermined quantity representative of a required change in radial velocity to control an orbit eccentricity component along a second axis perpendicular to the first axis, and a fourth quantity representative of a required change in normal velocity to control orbit inclination.

8. The method of claim 7 wherein the four thrusters are canted away from the anti-nadir face by a predetermined angle $\theta$ with respect to the north-south axis, the four thrusters are slewed about the north-south axis by a predetermined angle $\alpha$, and each of the four firing time durations is based upon a corresponding one of four change in velocity quantities, the four change in velocity quantities given by:

$$\Delta V_N(N_{A+}) = 1/2 \{[1/2(\Delta V_{DT} + \Delta V_{ET})/\tan\theta \tan\alpha] +$$

$$[1/2(\Delta V_{IN} - \Delta V_{ER}/\tan\theta)]\}$$

$$\Delta V_N(N_{A-}) = 1/2 \{[-1/2(\Delta V_{DT} + \Delta V_{ET})/\tan\theta \tan\alpha] +$$

$$[1/2(\Delta V_{IN} - \Delta V_{ER}/\tan\theta)]\}$$

$$\Delta V_N(S_{D+}) = 1/2 \{[1/2(\Delta V_{DT} - \Delta V_{ET})/\tan\theta \tan\alpha] +$$

$$[1/2(\Delta V_{IN} + \Delta V_{ER}/\tan\theta)]\}$$

$$\Delta V_N(S_{D-}) = 1/2 \{[-1/2(\Delta V_{DT} - \Delta V_{ET})/\tan\theta \tan\alpha] +$$

$$[1/2(\Delta V_{IN} + \Delta V_{ER}/\tan\theta)]\}$$

where:

$\Delta V_{DT}$ denotes the total tangential $\Delta V$ to control longitude mean motion, $\Delta V_{ET}$ denotes the total tangential $\Delta V$ to control orbit eccentricity component along the first axis, $\Delta V_{ER}$ denotes the total radial $\Delta V$ to control orbit eccentricity $\Delta V_{IN}$ denotes the total normal $\Delta V$ to control orbit inclination.

9. A station keeping system for a three-axis stabilized satellite, the system comprising:

four thrusters mounted in a generally rectangular configuration on an anti-nadir face of the satellite, each of the four thrusters having a line of thrust which passes through the center of mass of the satellite, the four thrusters including a northwest thruster, a northeast thruster, a southwest thruster, and a southeast thruster, the northwest thruster and the northeast thruster being canted away from the anti-nadir face in a north direction with respect to a north-south axis which passes through the center of mass of the satellite, the southwest thruster and the southeast thruster being canted away from the anti-nadir face in a south direction with respect to the north-south axis, the northeast thruster and the southeast thruster being slewed in an east direction about the north-south axis, the northwest thruster and the southwest thruster being slewed in an west direction about the north-south axis;

wherein the northeast thruster and the northwest thruster are fired near an orbit ascending node, and the southeast thruster and the southwest thruster are fired near an orbit descending node, each of the four thrusters being fired in accordance with a corresponding one of four firing time durations, each of the four firing time durations dependent upon a first predetermined quantity representative of a required change in tangential velocity to control longitude mean motion and a second predetermined quantity representative of a required change in tangential velocity to control an orbit eccentricity component along a first axis which connects the ascending node and the descending node, and wherein the four thrusters are slewed to provide effective control of the orbit eccentricity component.

10. The system of claim 9 wherein the northwest thruster is fired before the orbit ascending node and the northeast thruster is fired after the orbit ascending node.

11. The system of claim 9 wherein the southwest thruster is fired before the orbit descending node and the southeast thruster is fired after the orbit descending node.

12. The system of claim 8 wherein the northwest thruster and the northeast thruster are canted away from the anti-nadir face by a predetermined angle $\theta$ with respect to the north-south axis, and wherein the southwest thruster and the southeast thruster are canted away from the anti-nadir face by the predetermined angle $\theta$ with respect to the north-south axis.

13. The system of claim 9 wherein the northeast thruster and the southeast thruster are slewed about the north-south axis by a predetermined angle, and wherein the northwest thruster and the southwest thruster are slewed about the north-south axis by the predetermined angle $\alpha$.

14. The system of claim 13 wherein $\alpha$ is at least 10 degrees.

15. The system of claim 9 wherein each of the four firing time durations is further dependent upon a third predetermined quantity representative of a required change in radial velocity to control an orbit eccentricity component along a second axis perpendicular to the first axis, and a fourth quantity representative of a required change in normal velocity to control orbit inclination.

16. The system of claim 15 wherein the four thrusters are canted away from the anti-nadir face by a predetermined angle $\theta$ with respect to the north-south axis, the four thrusters are slewed about the north-south axis by a predetermined angle $\alpha$, and each of the four firing time durations is based upon a corresponding one of four change in velocity quantities, the four change in velocity quantities given by:

$$\Delta V_N(N_{A+}) = 1/2 \{[1/2(\Delta V_{DT} + \Delta V_{ET})/\tan\theta \tan\alpha] +$$
$$[1/2(\Delta V_{IN} - \Delta V_{ER}/\tan\theta)]\}$$

$$\Delta V_N(N_{A-}) = 1/2 \{[-1/2(\Delta V_{DT} + \Delta V_{ET})/\tan\theta \tan\alpha] +$$
$$[1/2(\Delta V_{IN} - \Delta V_{ER}/\tan\theta)]\}$$

$$\Delta V_N(S_{D+}) = 1/2 \{[1/2(\Delta V_{DT} - \Delta V_{ET})/\tan\theta \tan\alpha] +$$
$$[1/2(\Delta V_{IN} + \Delta V_{ER}/\tan\theta)]\}$$

$$\Delta V_N(S_{D-}) = 1/2 \{[-1/2(\Delta V_{DT} - \Delta V_{ET})/\tan\theta \tan\alpha] +$$
$$[1/2(\Delta V_{IN} + \Delta V_{ER}/\tan\theta)]\}$$

where:

$\Delta V_{DT}$ denotes the total tangential $\Delta V$ to control longitude mean motion, $\Delta V_{ET}$ denotes the total tangential $\Delta V$ to control orbit eccentricity component along the first axis, $\Delta V_{ER}$ denotes the total radial $\Delta V$ to control orbit eccentricity component along the second axis, and $\Delta V_{IN}$ denotes the total normal $\Delta V$ to control orbit inclination 17. A method of station keeping for a three-axis stabilized satellite in response to a failure of a first thruster of four thrusters, the four thrusters mounted in a generally rectangular configuration on an anti-nadir face of the satellite, each of the four thrusters having a line of thrust which passes through the center of mass of the satellite and is canted away from the anti-nadir face, the four thrusters including a north pair and a south pair, the method comprising the steps of:

shutting down a second thruster of the four thrusters, the second thruster located diagonally with respect to the first thruster;

firing a remaining north thruster of the north pair near an orbit ascending node;

firing a remaining south thruster of the south pair near the orbit descending node; and simultaneously firing the remaining north thruster and the remaining south thruster midway between the orbit ascending node and the orbit descending node, wherein the remaining north thruster and the remaining south thruster are simultaneously fired to control an orbit eccentricity component without substantially affecting a normal velocity component and a tangential velocity component.

18. The method of claim 17 wherein the orbit ascending node has a 90-degree right ascension angle, the orbit descending node has a 270-degree right ascension angle, the remaining north thruster is an eastern one of the north pair, the remaining south thruster is a western one of the south pair, and the simultaneous firing occurs at a right ascension angle of 0 degrees.

19. The method of claim 17 wherein the orbit ascending node has a 90-degree right ascension angle, the orbit descending node has a 270-degree right ascension angle, the remaining north thruster is an western one of the north pair, the remaining south thruster is a eastern one of the south pair, and the simultaneous firing occurs at a right ascension angle of 180 degrees.

20. The method of claim 17 wherein the remaining north thruster and the remaining south thruster are simultaneously fired at a time and duration dependent upon an eccentricity produced by a solar force and the steps of firing at the orbit ascending node and the orbit descending node.

* * * * *